April 20, 1965                G. R. COX                3,178,829
PROCESS AND APPARATUS FOR FREEZE DEHYDRATING OF FOOD MATERIAL
Filed May 25, 1962
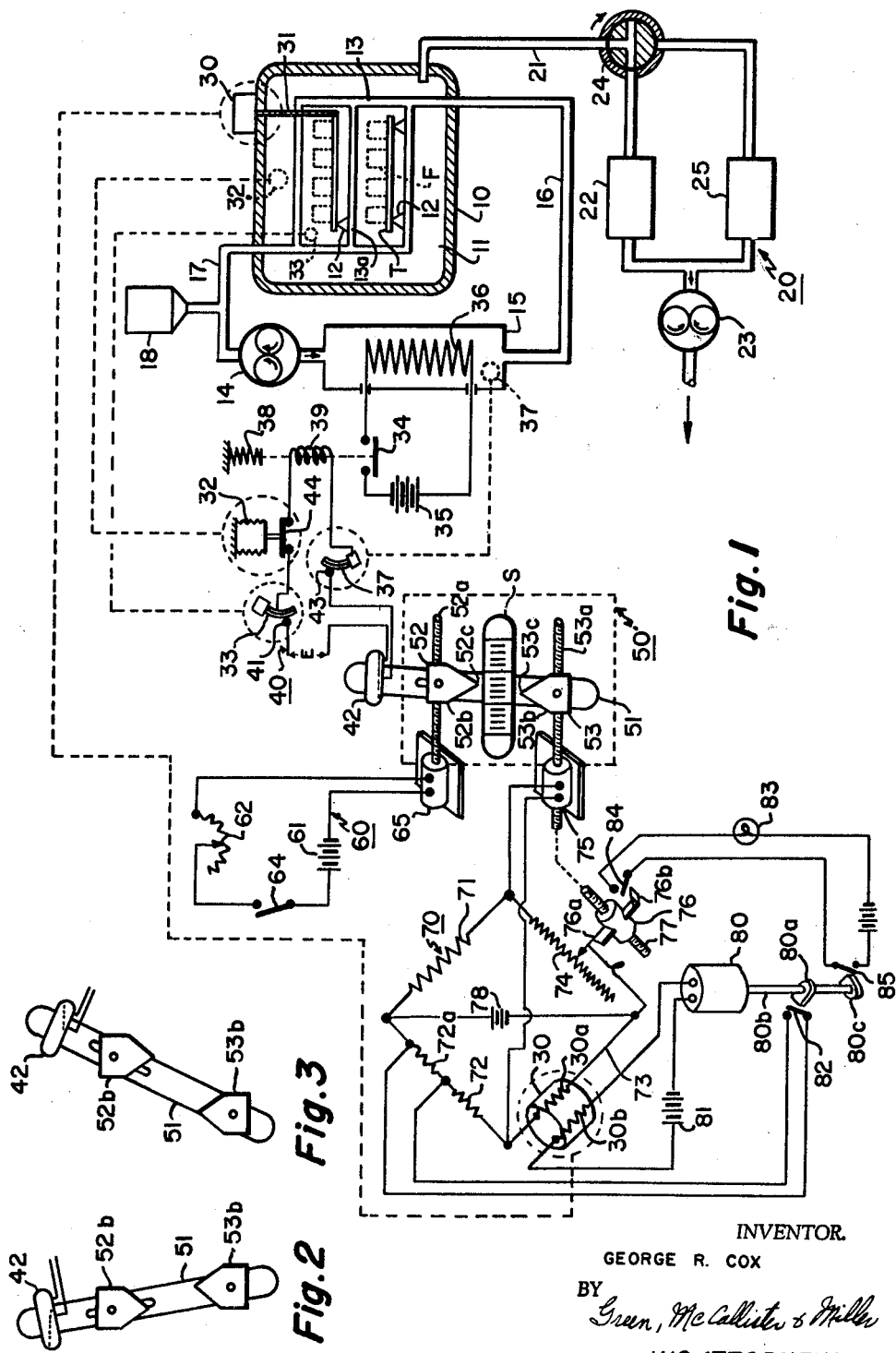
INVENTOR.
GEORGE R. COX
BY
Green, McCallister & Miller
HIS ATTORNEYS

United States Patent Office 3,178,829
Patented Apr. 20, 1965

3,178,829
PROCESS AND APPARATUS FOR FREEZE DE-
HYDRATING OF FOOD MATERIAL
George R. Cox, Pittsburgh, Pa., assignor to J. P. Devine
Manufacturing Company, Pittsburgh, Pa., a corporation of Pennsylvania
Filed May 25, 1962, Ser. No. 197,657
15 Claims. (Cl. 34—5)

This is a continuation-in-part of my co-pending application Serial No. 102,967, entitled "Procedure and Apparatus for Dehydrating Food Material," filed April 14, 1961.

This invention relates to apparatus and procedure for extracting moisture from food products to produce dried food which may be stored at atmospheric pressures and temperatures without deterioration. More specifically, this invention is directed to the control of such an operation.

A phase of this invention relates to the use of food product weight as a parameter in controlling a dehydration process. It includes a particular control method employing the parameter; the method involves scheduling the desired weight change with respect to time and comparing the actual weight change thereto to determine how to further control the process. A second phase of the invention relates to the provision of temperature and pressure controls for use in maintaining proper sublimation conditions to prevent injury to the food product. Another phase of the invention relates to the provision of a weight indicator having a pair of ranges of sensitivity that are alternately selectable to accurately inform the process operator of the instantaneous food product weight, especially near the termination of the process.

The existing art of freeze-drying or sublimation dehydration of foods commonly employs a vacuum chamber in which the frozen food product to be dehydrated is placed. The chamber is provided with a heat supply to drive-off moisture from the food by sublimation. The moisture driven-off is pumped from the chamber to maintain the necessary sub-atmosphere sublimation pressures within the chamber.

The cost, and hence the practicability of commercial freeze-drying is directly related to the time required for processing the food. Existing freeze-drying processes employ a constant heat supply rate limited as necessary to prevent the food product from being injured during that portion of the process having the minimum heat rate allowability. The processes require long periods of time to dehydrate a batch of food without unduly damaging its flavor or its ability to be reconstituted. Other existing freeze-drying processes employ fixed, open-loop scheduling controls based on approximations of the actual various rates of heat addition required during different portions thereof; however, these approximations are subject to unpredictable inaccuracies and may ruin an entire costly batch of food if, for example, the food has a somewhat different moisture content than that for which the approximation was developed.

Accordingly, it has been an object of my invention to provide a freeze-drying method that will materially reduce the time required for safely dehydrating a batch of food.

It has been a further object of my invention to provide an apparatus for automatically and accurately performing my inventive method.

Another object of my invention has been to provide an apparatus which will accurately indicate the end point of a dehydration process.

Another important object of my invention has been to provide an accurate means for indicating the instantaneous degree of dehydration of a food product and for increasing the accuracy of this means during the latter stages of the process.

A further important object of my invention has been to provide a freeze-drying chamber having a heating means therein that will apply heat to the food product substantially uniformly.

These and other objects will appear to those skilled in the art upon reading and understanding the following description of an illustrative embodiment wherein specific reference is made to the accompanying drawings of which:

FIGURE 1 is a schematic diagram of a preferred embodiment of my freeze-drying apparatus and an automatic control system for performing my inventive dehydration process.

FIGURES 2 and 3 are enlarged views of a controller element employed in the apparatus of FIGURE 1, illustrating two of its operative positions.

I have discovered that, during the early stages of a drying process, the amount of moisture within the food that will tend to be driven-off by a given heat supply may exceed the vapor-passing-ability of the food tissue and an internal pressure may build up to produce melting or non-sublimating conditions internally of the food. Also, the rate of moisture release into a conditioning chamber in response to a given heat input will be relatively large with respect to the capacity of the usual exhaust pump during the early stages of treatment. I have also discovered that during latter or terminal stages of the drying, when very little moisture is present, there is a severe tendency for the food product to overheat, thus causing changes in the flavor and other properties of the food.

From my discoveries, I have determined that the processing can be accomplished as rapidly as possible without danger of injury to the food product by the use of an accurate closed-loop control, based upon an approximated optimum dehydration rate for the particular food product, and which is supplemented by specific controls that are effective particularly during the early and latter stages of the processing. I have further discovered that the instantaneous weight of the food product can be accurately sensed to indicate the instantaneous condition or degree of dehydration of the product, and that this parameter is more useful than others, such as a means for directly sensing moisture content of the food.

I provide a control that continuously compares the actual state or degree of dehydration with the instantaneous desired state or degree of dehydration, to thus determine whether the actual dehydration processing is accurately following the scheduled optimum rate of dehydration. While such a control method can be performed manually, by visual observation, I prefer to employ automatic means.

I have also discovered that the final weight or end point of the processing critically affects the food quality and preservation stability. For example, some products will not keep at all with 3% moisture remaining, and change in taste if less than 2½% moisture remains. The end point is very difficult to determine accurately, due to the relatively slow dehydration rate during this portion of the processing and the correspondingly long period of time of about 2 to 3 hours required. I have provided means that is sensitive to the weight of the product for indicating when the desired amount of dehydration has been accomplished. I have also provided a control system that includes an indicator to accurately and continuously inform the operator of the instantaneous weight of the product. Furthermore, I have found that it is extremely useful to provide the indicator with means for increasing its sensitivity and expanding its scale during the terminal stages of the processing. The indicator may consist of a warning light or other signal, a calibrated scale, or both.

In developing my invention, I have discovered that uniformity of heat application to the food product being dehydrated is important, not only to make the most efficient use of the heat, but to also assure that the portion of the food product whose weight is measured for control is an accurate sample of all the products being processed. In this regard, I provide heating means above and below all of the food products being treated.

Referring more specifically to the illustrated embodiment of the drawings, in FIGURE 1, there is shown an enclosure or chamber-forming means 10 which provides an internal vacuum chamber or cavity 11 to receive the food product F. Chamber 11 is provided with means such as the racks 12 for supporting food trays T in a vertically-spaced relationship therein. Although two trays T are shown, it will be apparent that any number may be employed.

Heating means, such as radiators 13, are shown provided within the vacuum chamber 11 to supply heat for driving moisture from food products F. The radiators 13 may comprise a plurality of coils or passageways 13a for circulation of a suitable heating fluid, such as high temperature oil. To insure uniformity of heat application to all of the food products F in the chamber, the coils or passageways 13a pass both over and under each of the trays T. The heating means 13 forms part of a circuit including a circulating fluid or oil pump 14 which may preferably be of a positive displacement type, fluid or oil heater 15, a fluid or oil supply line or conduit 16 that passes through enclosure 10 of the vacuum chamber 11, and a fluid or oil return line, pipe or conduit 17 that passes through the enclosure 10 of the vacuum chamber 11. The oil return line 17 is provided with a reservoir or expansion tank 18 to insure that the fluid flow circuit is filled at all times and that excessive pressures are not built up therein.

The vacuum chamber 11 is further provided with a vacuum or sub-atmospheric moisture sublimating pressure creating system or means 20. This system comprises an exhaust conduit 21, a main freezing type condenser 22, and a positive displacement exhaust pump 23.

The sub-atmospheric pressure creating means 20 may also be provided with a selector valve 24 and an auxiliary condenser 25 in parallel with the main condenser 22. Such an arrangement conveniently permits the substitution of an auxiliary condenser 25 when the main condenser 23 requires defrosting; the only manipulation necessary to effect the substitution is to rotate the selector valve 24 from the position shown in FIGURE 1, clockwise to a position in which the exhaust conduit 21 is in direct fluid communication with the auxiliary condenser 25. In this way, the main condenser 22 need not be sufficiently large to operate continuously without defrosting during the entire period required for dehydrating a particular batch of food products.

The vacuum chamber 11 is shown provided with control sensing means or elements for measuring the parameters used in the control system. One of these sensing means is a load cell or dehydration sensing means 30 which is connected through suitable means, such as a link or chain 31, to at least one of the food product carrying trays T within chamber 11, to support the tray in a manner such that a known percentage of its weight is imposed upon the load cell. The load cell 30 consists essentially of a strain gauge 30a or other means that will vary a measurable electrical property as a function of the force applied thereto. Also within the chamber 11 is a pressure-responsive means, such as an evacuated bellows 32, that will indicate by its degree of contraction, the absolute pressure within the chamber. A temperature-responsive device, such as a bi-metallic strip 33, is located in the chamber 11 to accurately and continuously sense the food product temperature.

Each of the sensing means is provided with electrical signal transmitting means, lines or conduits, for relaying the information sensed in the chamber 11 to the control system or computer. For simplicity, the various sensing means have been shown in position in the control system and their positions within the chamber are indicated only schematically by broken line circles.

The control system comprises an output switch 34 that controls the supply of electric current from a power source 35 to a heating coil 36 or other suitable electric heating means within fluid or oil heater 15. It will be apparent to those skilled in the art that other sources of heat, such as steam, may be readily substituted for the electrical source shown.

The output switch 34 is normally held in an open position by a compression spring 38, and is actuated from its normal position by a solenoid 39 that is energized by a controlled electrical circuit 40.

The controlled electrical circuit 40 includes a suitable current source E and four control switches 41, 42, 43, and 44. The control switch 41 is actuated in response to the food product temperature, as sensed by the temperature-responsive means or device 33. The switch 41 is normally closed and will open when the food product temperature exceeds a predetermined maximum limit. Such an over-temperature condition will usually occur, if at all, during terminal stages of the processing.

The control switch 42 is the main or primary control element of the system and functions to detect the difference or error between the actual instantaneous degree of dehydration and a scheduled instantaneous degree of dehydration. Although I have shown a mercury switch as the preferred form of controlling element 42, it will be appreciated that any rapidly acting, non-wearing switch means may be employed. The details of the means for actuating control switch 42 are described hereafter in greater detail.

The controlled circuit 40 may also include an oil temperature limit switch 43. This switch will be normally closed and will be actuated to an open position by any suitable temperature responsive means, such as bi-metallic strip 37, upon an over-temperature condition of the oil in the heater 15.

Finally, the circuit 40 includes a chamber pressure responsive switch 44 that is actuated by the evacuated bellows 32 upon an over-pressure condition within the chamber 11.

It will be apparent that the solenoid 39 will be energized by the circuit 40 to close the switch 34, only when the control switches 41, 42, 43, and 44 are all in a closed position. Thus, an over-temperature condition of the food product, as sensed by means 33, an instantaneous over-schedule dehydration, as sensed by the mercury switch 42, an over-temperature of the heater oil, as sensed by means 37, or an over-pressure condition in chamber 11, as sensed by means 32, will open the control circuit 40 to de-energize solenoid 39, open switch 34, and temporarily discontinue the heat supply to oil heater 15.

A differential sensing means or comparing unit 50 is provided for actuating the primary control switch 42 to maintain the actual dehydration processing in step with the desired or scheduled dehydration processing, at least during a major portion of the operation. The differential sensing means preferably includes a floating lever controller or other mechanical differential means 51 upon which the mercury switch 42 is fixedly supported.

Two separate means or screw jacks 52 and 53 are provided for linearly-displacing opposite ends of the floating lever 51. The floating lever controller 51 receives a first or time scheduling signal adjacent its upper portion from the screw jack 52 that includes a rotatable threaded lead screw 52a and a follower member or part 52b. The lower end portion of the floating lever controller 51 receives a signal that is a function of the actual instantaneous degree of dehydration or food product weight from the screw jack 53 that includes a rotatable, threaded, lead screw 53a and a weight indicating output follower member or part 53b. The follower members 52b and 53b may be conveniently located adjacent a calibrated scale and provided with pointers 52c and 53c, respectively, to visually indicate the instantaneous, scheduled, and actual dehydration values.

The lead screw 52a is rotated by a time schedule drive motor 65 that turns at a rate that is a function of its current supply to move the follower 52b as a pre-set function of time. The current supplied to the motor 65 is provided by a scheduling circuit 60 that includes an electrical power source 61 and a current varying rheostat 62. The scheduled rate will be selected according to the nature of the particular food being processed. A starting switch 64 is provided for initiating the process by beginning the schedule motor drive.

Lead screw 53a is rotated by a motor 75 that receives current from a computing or weight sensing bridge circuit 70. Bridge circuit 70 is of the self-rebalancing type and basically includes a first leg 71 having a substantially fixed resistance, a second leg 72 having one of two fixed resistances, a third leg 73 having a resistance 30a provided by a load cell 30 and varied as a function of the actual food product weight, a fourth leg 74 having a resistance that is varied by a follow-up follower or arm 76 of a follow-up lead screw 77 that is driven by a motor 75, and a power source 78.

It will be seen that upon variation of the resistance 30a in the load cell 30 due to a change in food product weight, an error will develop across the bridge 70 to cause the motor 75 to rotate. This rotation will cause the lead screw 77 to drive follower 76 and re-position its associated contact arm or brush 76a to reduce the resistance of the fourth leg 74 of the bridge to eliminate the error. When the motor 75 has turned an amount sufficient to eliminate the error, both the follow-up follower 76 and the output follower 53b will have changed their positions by an amount that is a direct function of the change in food product weight.

The operation of the device thus far described is as follows: Upon closure of the starting switch 64 (which may be of a push button type), schedule motor 65 is actuated to rotate lead screw 52a that drives follower 52b to displace the upper portion of the floating lever controller 51 to the right of FIGURE 1. This displacement causes closure of the control switch 42 to supply energizing current to the solenoid 39, causing the switch 34 to be pulled upwardly, close its contacts, and complete the heating circuit. The heat supplied drives-off moisture from the food products by the process of sublimation and the moisture thus driven-off is removed by the sub-atmospheric pressure creating system 20. As the moisture is driven from the food products, the food product weight decreases, thus decreasing the resistance of element 30a within the load cell 30. The decrease in resistance 30a causes an upset in the weight-sensing bridge circuit 70. This upset causes the resistance in the fourth leg 74 of the bridge circuit 70 to also be reduced by movement of the motor 75, its lead screw 77, and follower 76 that carries the brush 76a. The output follower 53b is displaced by this movement of the motor 75 to displace the lower end portion of the floating lever controller 51 to the right of FIGURE 1, thus tending to restore lever 51 to a vertical orientation. If at any time, the actual dehydration exceeds that called for by the pre-determined schedule, lever 51 will rotate counterclockwise to open switch 42, and interrupt the heat supply.

If during the early stages of dehydration, the moisture is driven-off at a rate that cannot be handled by the sub-atmospheric pressure creating system 20, thus causing the pressure to rise within the chamber 11 to a point (usually about 0.5 to 1.5 mm. Hg absolute) near which sublimation without melting can no longer occur, the pressure responsive means 32 will open its associated switch 44 to de-energize solenoid 39, open switch 34 and interrupt the heat supply.

During the latter stages of dehydration, there is a tendency for the food product to overheat. To prevent food damage from such a tendency, the temperature-responsive switch 41 in the controlled circuit 40 will open upon an over-temperature condition of the food product F, as sensed by means 33, to terminate current flow to the solenoid 39 and allow the spring 38 to open switch 34 and temporarily discontinue the heat supply.

My invention also provides means for indicating the instantaneous weight of the food products and for increasing the accuracy of this indication near the critical end point of the processing. To this end, a scale S is conveniently positioned alongside pointer 53c of the weight-responsive output follower 53b. The pointer 53c of the follower 53b will visually indicate the instantaneous food product weight, as determined by the load cell 30 and the bridge 70. Also a pointer 52c cooperates with the scale S to visually indicate, at least during the early portions of the process, how the actual weight is following the scheduled desired weight change.

I have found it desirable to provide means for expanding the scale and increasing the sensitivity of the weight indicator during the terminal stages of the process. For example, the scale could go from 1 to 50 pounds during early processing stages and from 1 to 5 pounds during the terminal stages. This feature is particularly desirable, because the terminal stages of dehydration require a great deal of time, and the accuracy of the final weight of the food product or degree of dehydration is critical in maintaining a high dehydrated food quality. For this purpose, I provide a second means for sensing the weight of the food products F which can employ the same load cell 30 with a separate resistance 30b for controlling the displacement of a torque motor 80. The torque motor 80 is of a type that will have a total angular displacement of less than 360°, and its instantaneous angular displacement will be determined as a function of the current flowing therethrough. Accordingly, as the resistance of the load cell element 30b is reduced upon decrease in food product weight, the torque motor 80 will draw more current from a power source 81 and rotate to a new position as a function of food product weight. The rotation or weight indication produced by the motor 80 is used to reduce the resistance in the second leg 72 of the secondary bridge and thereby change the bridge constants to expand the bridge scale and increase the sensitivity or linear displacement of the output follower 53b with respect to a given change in the load cell resistance 30a. The reduction of the resistance in leg 72 may be accomplished by providing a short circuit or by-pass across a portion 72a of the leg resistance. The by-pass is completed upon engagement of a revaluation switch 82 by an actuator or cam 80a on an output shaft 80b of the torque motor 80.

I have also found it desirable to provide an indicator, that is readily discernible by an operator, to automatically indicate when the food products F have reached the desired final degree of dehydration. For this purpose, I provide a circuit including a lamp 83. The lamp 83 is controlled by a second arm 76b on the follow-up follower 76 which, during the terminal stages of the process will be positioned with the expanded and more sensitive scale, as provided by the revaluation of the bridge constants. The arm 76b will be designed to close a switch 84 to light lamp 83 at the desired end point of the processing. Since the follow-up follower 76 will be required to traverse the same positions during both the early and latter stages of the operation because of the shift in scale, I provide a second or range sensing switch 85 in the lamp lighting circuit that will be closed only during the terminal or revalued stage of the bridge operation. Switch 85 is closed by actuator or cam 80c of the shaft of the torque motor 80, shortly after the revaluation switch 82 is actuated. The lamp 83 will not light, of course, unless both switches are closed.

The operation of the scale expanding apparatus may be described as follows: As the weight of the food product F is decreased, the follow-up contact 76a of the bridge circuit is caused to move upwardly to the right in order to maintain a balance within the bridge circuit 70. When the weight has reached a predetermined value, such as 10% of its original value, torque motor 80 has turned clockwise a sufficient amount to close the revaluation switch 82. Upon such closure, a portion 72a of the second leg resistance 72 will be shorted out, providing a lower resistance in this leg. To re-balance the bridge 70, the resistance in the follow-up or fourth leg 74 of the bridge must be increased and accordingly an error will develop across the bridge causing current to drive the motor 75 in a direction to increase the fourth leg resistance 74 through follow-up follower 76, and simultaneously drive the indicating ouput follower 53b upscale to the point which indicates the actual instantaneous food product weight according to the expanded scale. The closing of revaluation switch 82 by shorting out the resistance portion 72a of the second leg 72 of the bridge 70 also has the effect of increasing the sensitivity of the bridge output, since in the shorted or revalued condition, the ratio of the first leg resistance 71 to the resistance of the second leg 72 has increased. Thus a given change of resistance 30a in the load cell 30, due to a decrease in weight of the food product F, will cause a greater upset or off-balancing of the bridge 70 and accordingly, require a greater displacement of the output motor 75 and screw jacks 53 and 77 in order to rebalance the bridge 70.

After the secondary bridge 70 has been revalued by the closure of the revaluation switch 82, the torque motor 80 continues to turn and will close the range-sensing switch 85 to prepare the end point lamp circuit for operation. The range-sensing switch 85 will be closed during substantially all of the revalued or terminal stages of the process. As the weight continues to decrease, the follow-up follower 76 will move upwardly to the right of FIGURE 1, rebalancing the secondary bridge 70. When the desired end point for the process is reached, the secondary arm 76b of the follow-up follower 76 will engage the lamp switch 84 to energize and light the lamp 83, indicating that the end point has been reached.

From the foregoing specific desecription of an illustrative embodiment of my invention it will be seen that frozen food products placed in my processing apparatus will be subjected to a sub-atmospheric pressure and heat causing sublimation of the moisture therefrom. The heat is supplied by a controlled system which includes a closed loop, time rate of dehydration schedule that is effected by comparing a desired food weight loss schedule to the actual food weight loss. The heat supply is further controlled to maintain a sufficiently low processing pressure, especially during early stages of the processing and to maintain a sufficiently low food temperature, especially during latter stages of the processing. As a matter of safety, the heat supply is automatically limited to protect heater components from over-temperature conditions.

The processing is monitored by a degree of dehydration indicator that has a compacted scale range during a major portion of the processing and has an automatically selected, expanded scale range of increased sensitivity during terminal stages of the processing. An end point indicator is automatically actuated to provide a readily discernible signal indicating that the processing has been completed.

From a processing standpoint, the food products to be dehydrated are cleaned and quickly frozen according to known practices. The frozen food products are then placed in the chamber of the processing apparatus wherein a vacuum is created and heat is added at a predetermined rate. If the products tend to dry too rapidly, the heat will be temporarily discontinued.

To maintain proper sublimation conditions, the pressure ambient to the food products is maintained below a predetermined value, usually in the neighborhood of 0.5 to 1.5 mm. Hg absolute pressure by temporarily discontinuing the heat supply. As the operation progresses, the rate of drying becomes much slower and the temperature of the products tend to rise. When the temperature reaches a maximum allowable value, the heat is temporarily discontinued to avoid cooking the food.

As the products reach the latter stages of dehydration, for example, 10% of their original weight, the food product weight indicator automatically changes its scale to a scale having about ten times greater accuracy; for example, the starting full scale may have a range of about 0 to 50 pounds, whereas the scale during the terminal stages may have a range of about 0 to 5 pounds. Thus, during the latter stages, the degree of dehydration of the food products may be more accurately monitored. Moisture will continue to be driven from the food products until their weight reaches a value predetermined to be the final desired weight, at which time a lamp will light signaling the end of the drying cycle. The food products are now ready to be packaged in an inert atmosphere such as nitrogen for storing or shipping.

While a specific embodiment of my invention has been disclosed for purposes of illustration, it will be apparent to those skilled in the art that various modifications can be made without departing from my inventive concept. For example, I have shown simple on-off controls which can be refined by those skilled in the art to proportional or even more complex systems, and each of the control parameters may be monitored if desired. Also, there are many commercially available components for performing the individual functions required by my novel system, and as these individual components form no part of my invention, I have chosen to illustrate relatively simple components that are combined in a preferred manner according to the best known mode of my invention.

What I claim is:

1. In apparatus for the sublimation dehydration of food products, the apparatus having an enclosure defining a chamber, means for supporting a frozen food product within the chamber, means for creating a moisture sublimating pressure in the chamber, and a variable heat supply to the chamber for driving-off moisture from the food product; an improved control system comprising, means for establishing a desired time schedule for the dehydration of the food product, means for detecting an error between the actual degree of dehydration and said scheduled dehydration, and means responsive to said error for regulating the heat supply.

2. Apparatus as defined in claim 1 for the sublimation dehydration of food products further comprising means responsive to the actual degree of dehydration of the food product for indicating when a predetermined final degree of dehydration has been reached.

3. In apparatus for dehydrating frozen food products the apparatus having an enclosure defining a chamber, means for supporting the food product within the chamber, and means for creating a moisture sublimating pressure in the chamber; an improvement comprising, means for uniformly heating all of the food product supported within said chamber for uniformly driving-off moisture therefrom, means for scheduling a desired rate of weight loss from the food product, means for sensing the actual instantaneous weight of some of the food product supported within said chamber, and means responsive to the difference between the scheduled instantaneous weight and said actual instantaneous weight for regulating the heat supply to eliminate said difference.

4. In apparatus for the sublimation dehydration of food products, the apparatus having an enclosure defining a chamber, means for supporting a frozen food product within the chamber, means including a pump for creating a moisture sublimating pressure within the chamber, and a variable heat supply to the chamber for driving-off moisture from the food product; an improved control system comprising, means for establishing a desired time schedule for the dehydration of the food product, means for detecting an error between the actual degree of dehydration and said scheduled dehydration, means responsive to said error for regulating the heat supply, and means responsive to the pressure within the chamber for further regulating the heat supply upon an over-pressure condition within the chamber.

5. In apparatus for the sublimation dehydration of food products the apparatus having an enclosure defining a chamber, means for supporting a frozen food product within the chamber, means for creating a moisture sublimating pressure within the chamber, and a variable heat supply to the chamber for driving-off moisture from the food product; an improved control system comprising, means for establishing a desired time schedule for the dehydration of the food product, means for detecting an error between the actual degree of dehydration and said scheduled dehydration, means responsive to said error for regulating the heat supply, and means responsive to the temperature of the food product for further regulating the heat supply upon an over-temperature condition of the food product.

6. In apparatus as defined in claim 4 said improved control system further comprising, means responsive to the temperature of the food product for further regulating the heat supply upon an over-temperature condition of the food product.

7. In apparatus for the sublimation dehydration of food products, the apparatus having an enclosure defining a chamber, means for supporting a frozen food product within the chamber, means for creating a moisture sublimating pressure in the chamber, and a variable heat supply to the chamber for driving-off moisture from the food product; an improved control system comprising, means for establishing a desired time schedule for the dehydration of the food product, means for sensing the actual weight of the food product as a measure of its degree of dehydration, means responsive to an error between the actual degree of dehydration and said scheduled dehydration for regulating the heat supply, and means responsive to said weight sensing means for indicating the actual instantaneous weight of the food product, said indicating means having a first predetermined scale and sensitivity for operation during the early stages of the dehydration, and means for substituting a second, expanded, predetermined scale having increased sensitivity during the latter stages of dehydration.

8. A method of controlling a dehydration process for food products and the like of the type wherein the products to be dehydrated are frozen and then subjected to heat in an evacuated chamber whereby the moisture contained in the food product is driven-off by sublimation, said method comprising the steps of:
(A) measuring the actual weight of the food product,
(B) comparing the thus-measured weight with a predetermined time schedule of dehydration to determine if an error exists therebetween, and
(C) regulating the supply of heat in a direction to eliminate said error.

9. A method of dehydrating frozen foods comprising the steps of:
(A) creating a moisture sublimating pressure around the food product to be treated,
(B) supplying heat to the food product,
(C) measuring the actual weight of the food product,
(D) comparing the thus measured weight with a predetermined time schedule of weight loss to determine if an error exists therebetween, and
(E) regulating the supply of heat in a direction to eliminate said error.

10. A method as defined in claim 9 further comprising the steps of:
(F) determining the actual pressure within the chamber, and
(G) reducing the supply of heat if the pressure so determined is above a predetermined maximum limit.

11. A method as defined in claim 9 further comprising the steps of:
(F) determining the actual temperature of the food product, and
(G) reducing the supply of heat if the temperature so determined is above a predetermined maximum limit.

12. Apparatus for performing a process of dehydrating frozen food products comprising an enclosure defining a chamber, means for supporting the food product within said chamber, means for creating a moisture sublimating pressure in said chamber, means for supplying heat to the food product for driving moisture therefrom, and means for indicating the instantaneous degree of dehydration of the food product throughout the process; said indicating means comprising, means for sensing the degree of dehydration of the food product, computer means responsive to said sensing means for producing a visual indicating output signal, said computer means further having a normally operative range of relatively low indicating output signal sensitivity and a selectively operable range of relatively higher indicating output signal sensitivity, and means responsive to the attainment of a predetermined degree of dehydration for modifying said computer means to select said indicating output operating range of higher sensitivity.

13. Apparatus for performing a process of dehydrating frozen food products comprising an enclosure defining a chamber, means for supporting the food product within said chamber, means for creating a moisture sublimating pressure in said chamber, means for supplying heat to the food product for driving moisture therefrom, and means for indicating the instantaneous degree of dehydration of the food product throughout the process; said indicating means comprising means continuously sensing a parameter that is indicative of the instantaneous degree of dehydration of the food product; computer means responsive to said parameter sensing means for producing a visual indicating output signal indicative of the instantaneous degree of the dehydration of the food product, said computer means having a first and a second range of operation, said second range having a higher indicating output signal sensitivity than said first range, and means responsive to the attainment of a predetermined degree of dehydration for modifying said computer means to select said first range for operation during early stages of the process and to select the second range for operation during latter stages of the process.

14. Apparatus as defined in claim 13 for performing a process of dehydrating frozen food products further comprising means responsive to said indicating output signal in said second range of operation for additionally indicating when a desired final degree of dehydration has been reached.

15. Apparatus for performing a process of dehydrating frozen food products comprising an enclosure defining a chamber, means for supporting the food product within said chamber, means for creating a moisture sublimating pressure in said chamber, means for supplying heat to the food product for driving moisture therefrom, and means for indicating the instantaneous degree of dehydration of the food product during the operation of the apparatus; said indicating means comprising means continuously sensing the food product weight; computer means responsive to said weight sensing means for producing a visual indicating output signal indicative of the instantaneous degree of dehydration of the food product, said computer means having a first and a second range of operation, said second range having a higher indicating output signal sensitivity than said first range, and means responsive to the attainment of a predetermined degree of dehydration for modifying said computer means to select said first range for operation during early stages of the process and to select the second range for operation during latter stages of the process.

References Cited by the Examiner
UNITED STATES PATENTS

| | | | |
|---|---|---|---|
| 1,812,016 | 6/31 | Nieloud | 34—48 |
| 2,148,720 | 2/39 | Armstrong | 34—48 |
| 2,185,773 | 1/40 | Nash | 200—152 |
| 2,275,317 | 3/42 | Ryder | 236—74 |
| 2,366,501 | 1/45 | Gille | 219—20.41 |
| 2,453,033 | 11/48 | Patterson | 34—5 |
| 2,484,594 | 10/49 | Spangenberg | 34—48 |
| 2,668,364 | 2/54 | Colton | 34—5 |
| 2,994,132 | 8/61 | Neumann | 34—5 |
| 3,060,591 | 10/62 | Liebermann | 34—45 |

NORMAN YUDKOFF, *Primary Examiner.*